United States Patent
Son et al.

(10) Patent No.: US 7,910,263 B2
(45) Date of Patent: Mar. 22, 2011

(54) ELECTRODE INCLUDING A HETEROPOLY ACID ADDITIVE FOR FUEL CELL, MEMBRANE-ELECTRODE ASSEMBLY FOR FUEL CELL INCLUDING SAME, AND FUEL CELL SYSTEM INCLUDING THE SAME

(75) Inventors: In-Hyuk Son, Yongin-si (KR); Sang-Il Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 541 days.

(21) Appl. No.: 11/923,601

(22) Filed: Oct. 24, 2007

(65) Prior Publication Data

US 2008/0102338 A1 May 1, 2008

(30) Foreign Application Priority Data

Oct. 26, 2006 (KR) .......................... 10-2006-0104465
Oct. 23, 2007 (KR) .......................... 10-2007-0106771

(51) Int. Cl.
*H01M 4/02* (2006.01)
(52) U.S. Cl. ........ 429/523; 429/530; 429/532; 429/483; 429/492
(58) Field of Classification Search .................. 429/40, 429/41, 42, 43, 44, 30, 34; 502/100, 102, 502/150, 174
See application file for complete search history.

(56) References Cited

U.S. PATENT DOCUMENTS

| 5,298,343 A * | 3/1994 | Savadogo et al. ............... 429/44 |
| 2004/0053113 A1 | 3/2004 | Nishikawa et al. |
| 2006/0141334 A1 | 6/2006 | Nakajima et al. |

FOREIGN PATENT DOCUMENTS

| CN | 1246385 A | 3/2000 |
| CN | 1624963 A | 6/2005 |
| JP | 2004-241307 | 8/2004 |
| JP | 2005-129285 | 5/2005 |
| KR | 10-2004-0029955 | 4/2004 |
| KR | 10-2004-0047706 | 6/2004 |
| WO | WO 2006/124959 A2 | 11/2006 |

OTHER PUBLICATIONS

Office action dated Sep. 24, 2009 issued in corresponding Korean priority Application No. 10-2007-0106771.
Limoges B.R. et al: Electrocatalyst materials for fuel cells based on the polyoxometalates $[Pmo_{(12-n)} V_nO_{40}]^{(3+n)-}$ (n=0-3), Electrochimica Acta, vol. 50, No. 5, pp. 1169-1179 (2005), XP004668353.
Extended European Search Report dated Jan. 17, 2008, for European Application No. 07119324.7 indicating relevance of cited references in this IDS.
Korean Notice of Decision to Grant dated Mar. 16, 2010, for priority Korean application 10-2007-0106771, noting listed references in this IDS.

* cited by examiner

*Primary Examiner* — Raymond Alejandro
(74) *Attorney, Agent, or Firm* — Christie, Parker & Hale, LLP

(57) ABSTRACT

An electrode for a fuel cell includes an electrode substrate and a catalyst layer on the electrode substrate. The catalyst layer includes an active catalyst and a heteropoly acid additive including a heteropoly acid supported by an inorganic carrier.

15 Claims, 1 Drawing Sheet

ELECTRODE INCLUDING A HETEROPOLY ACID ADDITIVE FOR FUEL CELL, MEMBRANE-ELECTRODE ASSEMBLY FOR FUEL CELL INCLUDING SAME, AND FUEL CELL SYSTEM INCLUDING THE SAME

CROSS-REFERENCES TO RELATED APPLICATIONS

This application claims priority to and the benefit of Korean Patent Application No. 10-2006-0104465 filed in the Korean Intellectual Property Office on Oct. 26, 2006, and No. 10-2007-0106771 filed in the Korean Intellectual Property office on Oct. 23, 2007, the entire contents of which are incorporated herein by reference.

BACKGROUND OF THE INVENTION

1. Field of the Invention

The present invention relates to an electrode for a fuel cell, and a membrane-electrode assembly and a fuel cell system including the same.

2. Description of the Related Art

A fuel cell is a power generation system for producing electrical energy through an electrochemical redox reaction of an oxidant and a fuel such as hydrogen or a hydrocarbon-based material such as methanol, ethanol, natural gas, and the like.

A fuel cell is a clean energy alternative that can replace fossil fuels. In addition, a fuel cell has relatively high power output density and energy conversion efficiency, can operate at room temperature, and can have a relatively small-size that can be tightly sealed. Therefore, a fuel cell can be applicable to a wide array of fields such as non-polluting automobiles, electricity generation systems, and portable power sources for mobile equipment, military equipment, and the like.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has relatively high energy density and high power, but requires extra handling capabilities for processing hydrogen gas (or hydrogen-rich gas) and related accessories, such as a fuel reforming processor for reforming methane or methanol, natural gas, and the like in order to produce the hydrogen gas as the fuel.

By contrast, a direct oxidation fuel cell has lower energy density than that of the polymer electrolyte fuel cell, but it does not need a fuel reforming processor, and can operate at room temperature due to its relatively low operation temperature.

In a fuel cell system, a stack that generates electricity includes unit cells that are stacked adjacent to one another, and each of the unit cells is formed of a membrane-electrode assembly (MEA) and one or more separators (also referred to as bipolar plates). The membrane-electrode assembly is composed of an anode (also referred to as a "fuel electrode" or an "oxidation electrode"), a cathode (also referred to as an "air electrode" or a "reduction electrode"), and a polymer electrolyte membrane between the anode and the cathode.

Electricity is generated as follows. A fuel is supplied to the anode, adsorbed by catalysts of the anode, and then oxidized to produce protons and electrons. The electrons are transferred into the cathode via an external circuit, and the protons are transferred into the cathode through the polymer electrolyte membrane. In addition, an oxidant is supplied to the cathode. Then the oxidant, protons, and electrons react with one another on catalysts of the cathode to produce heat along with water.

SUMMARY OF THE INVENTION

Aspects of embodiments the present invention relates to an electrode for a fuel cell that can lower a cost of manufacturing a fuel cell and increase power output of a fuel cell, and a membrane-electrode assembly and a fuel cell system including the same.

According to an aspect of an embodiment of the present invention provides an electrode that can lower a cost of manufacturing a fuel cell and improve power characteristics.

According to another aspect of an embodiment of the present invention there is provided a membrane-electrode assembly that includes the electrode.

According to another aspect of an embodiment of the present invention there is provided a fuel cell system that includes the membrane-electrode assembly.

An embodiment of the present invention provides an electrode for a fuel cell. The electrode includes an electrode substrate and a catalyst layer on the electrode substrate. The catalyst layer includes an active catalyst and a heteropoly acid additive including a heteropoly acid supported by an inorganic carrier.

In one embodiment, the additive has an average particle diameter ranging from about 1 nm to about 100 μm.

In one embodiment, the inorganic carrier includes a material selected from the group consisting of $SiO_2$, zeolite, alumina, and combinations thereof.

In one embodiment, the heteropoly acid includes a compound including an anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

In one embodiment, the heteropoly acid includes a compound including a $H^+$ cation.

In one embodiment, the heteropoly acid is present in an amount ranging from about 0.01 to about 10 wt % based on the weight of the carrier.

In one embodiment, the additive is present in an amount ranging from about 0.1 to about 5 wt % based on the total weight of the catalyst layer.

Another embodiment of the present invention provides a membrane-electrode assembly for a fuel cell. The membrane-electrode assembly includes: an anode; a cathode facing the anode; and a polymer electrolyte membrane interposed between the anode and the cathode. Here, at least one of the anode or the cathode includes an electrode substrate and a catalyst layer on the electrode substrate, and the catalyst layer includes an active catalyst and a heteropoly acid additive including a heteropoly acid supported by an inorganic carrier.

Another embodiment of the present provides a fuel cell system. The fuel cell includes: an electricity generating element; a fuel supplier for supplying the electricity generating element with a fuel; and an oxidant supplier for supplying the electricity generating element with an oxidant. The electricity generating element includes an anode, a cathode facing the anode, and a polymer electrolyte membrane interposed between the anode and the cathode. At least one of the anode or the cathode includes an electrode substrate and a catalyst layer on the electrode substrate, and the catalyst layer includes an active catalyst and a heteropoly acid additive including a heteropoly acid supported by an inorganic carrier.

DETAILED DESCRIPTION

Figure 1:
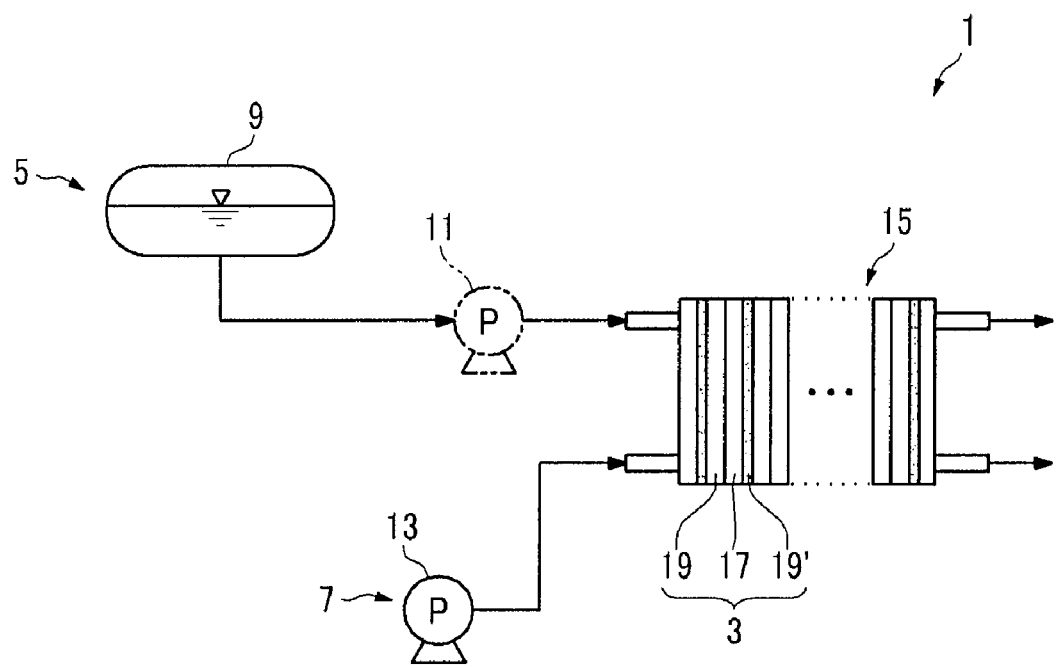
FIG. 1 is a schematic cross-sectional view showing a membrane-electrode assembly according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

An embodiment of the present invention is directed toward an electrode for a fuel cell. Recently, research on electrode catalysts with relatively high activity has been undertaken.

Research has been made on heteropoly acid such as $H_3PW_{12}O_{40}$. Heteropoly acid is a solid catalyst having relatively high electron and proton conductivity, and it is regarded as a highly-active platinum-based catalyst substitute. It has some disadvantages in that it is well-dissolved in a polar aqueous solution such as water, methanol, and ethanol so that it does not have a high reactivity, and in that it may be easily separated from a carrier.

According to an embodiment of the present invention, heteropoly acid is supported by an inorganic carrier, and is thereafter used as an additive (or a heteropoly acid additive) to an electrode that improves the power characteristic.

An electrode of an embodiment of the present invention includes an electrode substrate and a catalyst layer disposed on the electrode substrate. The catalyst layer includes a catalyst and an additive. The additive may include heteropoly acid supported by an inorganic carrier. When the heteropoly acid is not supported by an inorganic carrier, it may be dissolved in a reactant such as a fuel, e.g., a hydrocarbon fuel or a mixture of fuel and water, rendering the acid diluted and thereby cannot maintain the desired power.

In one embodiment, the additive has an average particle diameter ranging from about 50 to about 100 nm (or from 50 to 100 nm). When the average particle diameter of the active is within the above range, the additive has a very similar size to that of the catalyst. Accordingly, the catalyst and the additive may be homogenously mixed, accomplishing the desired catalyst and additive usage effects.

The inorganic carrier is selected from the group consisting of $SiO_2$, zeolite, alumina, and combinations thereof. Such a carrier may stably support heteropoly acid, and may thereby maximize addition effects of the heteropoly acid.

The heteropoly acid may be a compound including an anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof. The heteropoly acid may include $H^+$ for a cation bound with the anion. Such heteropoly acid has high electron and proton conductivity.

The heteropoly acid is present in an amount ranging from about 0.01 to about 10 wt % (or from 0.01 to 10 wt %) based on the weight of the carrier. For example, a ratio of the heteropoly acid to the carrier ranges from 0.01:100 to 10:100 by wt %. When the amount of the heteropoly acid is present in an amount of less than 0.01 wt %, the addition effect is not sufficient, while when it is in an amount of more than 10 wt %, it may be dissolved in a solvent during the formation of a catalyst layer.

The additive may be obtained by dissolving heteropoly acid in a solvent and then mixing the solution with an inorganic carrier with nano-size particles. Here, the solvent may include any suitable material having a polarity, for example $H_2O$, ethanol, methanol, isopropyl alcohol, and the like.

According to an embodiment of the present invention, the additive (including the heteropoly acid supported by the carrier) is included in an amount ranging from 0.1 to 5 wt % based on the entire weight of a catalyst layer. When the additive is included in an amount of less than 0.1 wt %, it may have little usage effects. On the other hand, when included in an amount of more than 5 wt %, the catalyst layer may become to thick, thereby deteriorating power output.

The active catalyst may be any suitable catalyst that may perform a fuel cell reaction. The catalyst may representatively include a platinum-based catalyst. The platinum-based catalyst includes platinum, ruthenium, osmium, a platinum-ruthenium alloy, a platinum-osmium alloy, a platinum-palladium alloy, a platinum-M alloy, or combinations thereof, where M is a transition metal selected from the group consisting of Ga, Ti, V, Cr, Mn, Fe, Co, Ni, Cu, Zn, Sn, Mo, W, Rh, Ru, and combinations thereof. Representative examples of the catalysts include a material selected from the group consisting of Pt, Pt/Ru, Pt/w, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a catalyst may be used in a form of a metal itself (black catalyst), or can be used while being supported by a carrier. The carrier may include carbon such as graphite, denka black, ketjen black, acetylene black, carbon nanotubes, carbon nanofiber, carbon nanowire, carbon nanoballs, activated carbon, and so on, or an inorganic particulate such as alumina, silica, zirconia, titania, and so on. In one embodiment, carbon is used.

The catalyst layer may include a binder resin to improve its adherence and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. In one embodiment, the polymer resin include a proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof. In one embodiment, the proton conductive polymer is poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and/or poly(2,5-benzimidazole).

The hydrogen (H) in the cation exchange group of the proton conductive polymer may be substituted with Na, K, Li, Cs, or tetrabutylammonium. When the H in the cation exchange group of the terminal end of the proton conductive polymer side chain is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used (e.g., suitable hydroxide compounds may be used).

The binder resin may include only one type of resin or be used in combination with other resins. Further, the resin may be used along with one or more non-conductive polymers to improve adherence with a polymer electrolyte membrane. The amount of the binder resin may be varied to achieve certain desired characteristics.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrate supports the electrode, and provides pathways for transferring fuel and oxidant to the catalyst layer In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrate may be treated with a fluorine-based resin to be water-repellent to prevent (or protect from) deterioration of the fuel cell diffusion efficiency. The deterioration can occur due to water generated during the operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL) may be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, ketjen black, activated carbon, carbon fiber, fullerene, nanocarbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoroethylene, polyvinylidenefluoride, polyhexafluoropropylene, polyperfluoroan alkylvinylether, polyperfluorosulfonylfluoride, alkoxyvinyl ether, polyvinylalcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, gravure coating, dip coating, silk screening, painting, and so on, depending on the viscosity of the composition.

According to one embodiment of the present invention, an electrode includes a catalyst composition prepared by mixing an additive with an active catalyst, then mixing the mixture with a binder or by mixing the additive with a binder first, and then mixing the acquired mixture with an active catalyst. The mixing process may be performed in a particular solvent or may not include a solvent since a binder is generally included in a solvent as a ready-made product. In the case when a solvent is used, the solvent may include, but is not limited to, an alcohol such as ethanol, isopropyl alcohol, n-propyl alcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, and so on, depending on the viscosity of the composition.

According to one embodiment of the present invention, an electrode having the above structure may be applied to either an anode or a cathode, or to both the anode and the cathode. When the electrode of the present invention is used as an anode, it can improve fuel oxidation. When it is used as a cathode, it can improve proton conductivity. As a result, the electrode can have an improved oxidant reduction reaction and thereby providing a membrane-electrode assembly, with a relatively high power. In addition, since heteropoly acid is lower in cost than a conventional platinum-based catalyst and can still act as a catalyst, cost of the electrode may be reduced in proportion to the amount of heteropoly acid used.

According to one embodiment of the present invention, a membrane-electrode assembly includes an anode and a cathode, and a polymer electrolyte membrane interposed between the cathode and the anode. Here, at least one of the anode or the cathode may have the electrode structure as described above.

The polymer electrolyte membrane functions as an ion-exchange member to transfer protons generated in an anode catalyst layer of the cathode catalyst layer. The polymer electrolyte membrane of the membrane-electrode assembly may include a proton conductive polymer resin. The proton conductive polymer resin may be a polymer resin having a cation exchange group selected from the group consisting of a sulfonic acid group, a carboxylic acid group, a phosphoric acid group, a phosphonic acid group, and derivatives thereof, at its side chain.

In one embodiment, the polymer resin may include a proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof. In one embodiment, the proton conductive polymer is poly(perfluorosulfonic acid) (NAFION™), poly (perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and/or poly(2,5-benzimidazole).

The hydrogen (H) in the proton conductive group of the proton conductive polymer can be substituted with Na, K, Li, Cs, or tetrabutylammonium. When the H in the ionic exchange group of the terminal end of the proton conductive polymer side chain is substituted with Na or tetrabutylammonium, NaOH or tetrabutylammonium hydroxide may be used, respectively. When the H is substituted with K, Li, or Cs, suitable compounds for the substitutions may be used.

In one embodiment of the present invention, a fuel cell system includes a membrane-electrode assembly as described above. Here, the fuel cell system includes at least one electricity generating element, a fuel supplier, and an oxidant supplier.

The electricity generating element includes the membrane-electrode assembly and a separator. The membrane-electrode assembly includes a polymer electrolyte membrane, and a cathode and an anode respectively disposed at opposite sides of the polymer electrolyte membrane. The electricity generating element generates electricity through oxidation of a fuel and reduction of an oxidant.

The fuel supplier plays a role of supplying the electricity generating element with a fuel. The oxidant supplier plays a role of supplying the electricity generating element with an oxidant such as oxygen or air.

The fuel includes liquid or gaseous hydrogen, or a hydrocarbon-based fuel such as methanol, ethanol, propanol, butanol, natural gas, etc.

FIG. 1 shows a schematic structure of a fuel cell system according to an embodiment of the present invention. Here, the fuel cell system is shown such that a fuel and an oxidant are provided to the electricity generating element through pumps, but the present invention is not limited to such structures. The fuel cell system of the present invention alternatively can include a structure wherein a fuel and an oxidant are provided in a diffusion manner.

A fuel cell system 1 includes at least one electricity generating element (or elements) 3 that generates electrical energy through an electrochemical reaction of a fuel and an oxidant, a fuel supplier 5 for supplying the fuel to the electricity generating element 3, and an oxidant supplier 7 for supplying the oxidant to the electricity generating element 3.

In addition, the fuel supplier 5 is equipped with a tank 9 that stores the fuel, and a fuel pump 11 that is connected therewith. The fuel pump 11 supplies the fuel stored in the tank 9 with a pumping power that may be predetermined.

The oxidant supplier 7, which supplies the electricity generating element 3 with an oxidant, is equipped with at least one pump (or pumps) 13 for supplying the oxidant with a pumping power (that can be predetermined).

The electricity generating element 3 includes a membrane-electrode assembly 17 that oxidizes hydrogen or the fuel and reduces the oxidant, separators 19 and 19' that are respectively positioned at opposite sides of the membrane-electrode assembly to supply hydrogen or the fuel, and the oxidant. Stack 15 may include one or more of the electricity generating elements 3.

The following examples illustrate the present invention in more detail. However, the present invention is not limited by these examples.

EXAMPLE 1

$H_3PW_{12}O_{40}$ was dissolved in water, and thereafter supported by a $SiO_2$ carrier having an average particle size of 100 nm and a specific surface area of 150 $m^2/g$ to thereby prepare an $H_3PW_{12}O_{40}$ additive with $H_3PW_{12}O_{40}$ supported by the $SiO_2$ carrier. Here, $H_3PW_{12}O_{40}$ was supported (or supported by the carrier) in an amount of 0.01 wt % based on the weight of $SiO_2$. For example, a ratio of $H_3PW_{12}O_{40}$ to $SiO_2$ is 0.01:100 by wt %.

5 wt % of the $H_3PW_{12}O_{40}$ additive was mixed with 95 wt % of a Pt—Ru black (Johnson Matthey, HiSpec 6000) anode catalyst. The resulting mixture was mixed with a 5 wt %-NAFION/$H_2O$/2-propanol (Solution Technology Inc.) binder in a weight ratio of 88 wt %:12 wt % to prepare a catalyst composition for an anode.

On the other hand, a Pt black (Johnson Matthey, HiSpec 100) cathode catalyst was mixed with a 5 wt %-NAFION/$H_2O$/2-propanol (Solution Technology Inc.) binder in a weight ratio of 88 wt %:12 wt % to prepare a catalyst composition for a cathode.

The catalyst compositions for the anode and for the cathode were coated on a carbon paper to respectively prepare the anode and the cathode.

The prepared anode, the prepared cathode, and a commercially-available Nafion 115 (perfluorosulfonic acid) polymer electrolyte membrane were used to form a membrane-electrode assembly.

The membrane-electrode assembly for a fuel cell was inserted between two sheets of gaskets, and then between two separators having a gas channel and a cooling channel with a certain (or predetermined) shape and compressed between copper end plates to fabricate a unit cell.

EXAMPLE 2

A unit cell was fabricated by the same (or substantially the same) method as in Example 1, except that $H_3PW_{12}O_{40}$ was supported in an amount of 1 wt % based on the weight of $SiO_2$. For example, a ratio of $H_3PW_{12}O_{40}$ to $SiO_2$ is 1:100 by wt %.

EXAMPLE 3

A unit cell was fabricated by the same (or substantially the same) method as in Example 1, except that $H_3PW_{12}O_{40}$ was supported in an amount of 2 wt % based on the weight of $SiO_2$.

EXAMPLE 4

A unit cell was fabricated by the same (or substantially the same) method as in Example 1, except that $H_3PW_{12}O_{40}$ was supported in an amount of 6 wt % based on the weight of $SiO_2$.

EXAMPLE 5

A unit cell was fabricated by the same (or substantially the same) method as in Example 1, except that $H_3PW_{12}O_{40}$ was supported in an amount of 10 wt % based on the weight of $SiO_2$.

REFERENCE EXAMPLE 1

A unit cell was fabricated by the same (or substantially the same) method as in Example 1, except that $H_3PW_{12}O_{40}$ was supported in an amount of 0.001 wt % based on the weight of $SiO_2$.

REFERENCE EXAMPLE 2

A unit cell was fabricated by the same (or substantially the same) method as in Example 1, except that $H_3PW_{12}O_{40}$ was supported in an amount of 11 wt % based on the weight of $SiO_2$.

COMPARATIVE EXAMPLE 1

A Pt—Ru black (Johnson Matthey, HiSpec 6000) anode catalyst was mixed with a 5 wt %-Nafion/$H_2O$/2-propanol (Solution Technology Inc.) binder in a weight ratio of 88 wt %:12 wt % to prepare a catalyst composition for an anode.

Further, a Pt black (Johnson Matthey, HiSpec 100) cathode catalyst was mixed with a 5 wt %-Nafion/$H_2O$/2-propanol (Solution Technology Inc.) binder in a weight ratio of 88 wt %:12 wt % to prepare a catalyst composition for a cathode.

The catalyst compositions for the anode and the cathode were coated on carbon paper to respectively prepare the anode and the cathode.

Then, the prepared anode, the prepared cathode, and a commercially-available Nafion 115 (perfluorosulfonic acid) polymer electrolyte membrane were used to form a membrane-electrode assembly.

The membrane-electrode assembly for a fuel cell was inserted between two sheets of gaskets and then between two separators having a gas channel and a cooling channel with a certain (or predetermined) shape, and then compressed between copper end plates to fabricate a unit cell.

Power densities of the unit cells fabricated according to Examples 1 to 5, Reference Examples 1 and 2, and Comparative Example 1 at 0.35V, 0.4V, and 0.45V were measured at 70° C. and the results are shown in Table 1.

TABLE 1

| | Additive amount | 70° C., mW/cm$^2$ | | |
|---|---|---|---|---|
| | ($H_3PW_{12}O_{40}/SiO_2$), wt % | 0.45 V | 0.4 V | 0.35 V |
| Reference Example 1 | 0.001 | 85 | 112 | 128 |
| Example 1 | 0.01 | 85 | 113 | 132 |
| Example 2 | 1 | 90 | 125 | 145 |
| Example 3 | 2 | 95 | 128 | 154 |
| Example 4 | 6 | 98 | 135 | 165 |
| Example 5 | 10 | 86 | 115 | 145 |
| Reference Example 2 | 11 | 82 | 110 | 131 |
| Comparative Example 1 | 0 | 85 | 112 | 131 |

As shown in Table 1, the cells including the electrodes according to Examples 1 to 5 where from 0.01 to 10 wt % of $H_3PW_{12}O_{40}$ were impregnated in (or supported by) the $SiO_2$ carriers show improved power densities as compared to that according to Comparative Example 1 without the additive. Further, the cell according to Reference Example 1 where the additive was added in a relatively small amount of 0.001 wt % of $H_3PW_{12}O_{40}$ and the cell according to Reference Example 2 where the additive was added in a relatively large amount of 11 wt % of $H_3PW_{12}O_{40}$ show rather lower power density than the cell according to Comparative Example 1.

EXAMPLE 6

A unit cell was fabricated by the same (or substantially the same) method as in Example 1, except that $H_3PW_{12}O_{40}$ was supported in an amount of 2 wt % based on the weight of $SiO_2$ as in Example 3 and then 0.1 wt % of the obtained $H_3PW_{12}O_{40}$ additive was mixed with 99.9 wt % of Pt—Ru black (Johnson Matthey, HiSpec 6000) anode catalyst.

EXAMPLE 7

A unit cell was fabricated by the same (or substantially the same) method as in Example 6, except that 1 wt % of the $H_3PW_{12}O_{40}$ additive was mixed with 99 wt % of Pt—Ru black (Johnson Matthey, HiSpec 6000) anode catalyst.

EXAMPLE 8

A unit cell was fabricated by the same (or substantially the same) method as in Example 6, except that 2 wt % of the $H_3PW_{12}O_{40}$ additive was mixed with 98 wt % of Pt—Ru black (Johnson Matthey, HiSpec 6000) anode catalyst.

EXAMPLE 9

A unit cell was fabricated by the same (or substantially the same) method as in Example 6, except that 3 wt % of the $H_3PW_{12}O_{40}$ additive was mixed with 97 wt % of Pt—Ru black (Johnson Matthey, HiSpec 6000) anode catalyst.

REFERENCE EXAMPLE 3

A unit cell was fabricated by the same (or substantially the same) method as in Example 6, except that 0.01 wt % of the $H_3PW_{12}O_{40}$ additive was mixed with 99.99 wt % of Pt—Ru black (Johnson Matthey, HiSpec 6000) anode catalyst.

REFERENCE EXAMPLE 4

A unit cell was fabricated by the same (or substantially the same) method as in Example 6, except that 6 wt % of the $H_3PW_{12}O_{40}$ additive was mixed with 94 wt % of Pt—Ru black (Johnson Matthey, HiSpec 6000) anode catalyst.

Power densities of the unit cells fabricated according to Examples 6 to 9, and Reference Examples 3 and 4 at 0.35V, 0.4V, and 0.45V were measured at 70° C. and the results are shown in Table 2. For comparison, the measurement results of Example 3 and Comparative Example 1 were also given.

TABLE 2

| | Additive amount with respect to the catalyst | 70° C., mW/cm$^2$ | | |
|---|---|---|---|---|
| | amount, wt % | 0.45 V | 0.4 V | 0.35 V |
| Reference Example 3 | 0.01 | 85 | 112 | 131 |
| Example 6 | 0.1 | 86 | 114 | 132 |
| Example 7 | 1 | 88 | 121 | 148 |
| Example 8 | 2 | 90 | 123 | 150 |
| Example 9 | 3 | 93 | 123 | 152 |
| Example 3 | 5 | 95 | 126 | 154 |
| Reference Example 4 | 6 | 81 | 128 | 120 |
| Comparative Example 1 | 0 | 85 | 112 | 131 |

As shown in Table 2, the cell including the electrode according to Examples 3 and 6 to 9 where from 0.1 to 5 wt % of $H_3PW_{12}O_{40}$ additives were mixed with the anode catalysts show improved power densities as compared to that according to Comparative Example 1 without the additive. Further, the cell according to Reference Example 3 where the additive was added in a relatively small amount of 0.01 wt % and the cell according to Reference Example 4 where the additive was added in a relatively large amount of 6 wt % show rather lower power density than the cell according to Comparative Example 1.

EXAMPLE 10

$H_3PW_{12}O_{40}$ was supported in an amount of 2 wt % based on the weight of $SiO_2$ as in Example 3 and then 0.1 wt % of the obtained $H_3PW_{12}O_{40}$ additive was mixed with 99.9 wt % of Pt—Ru black (Johnson Matthey, HiSpec 6000) cathode catalyst. The resulting mixture was mixed with a 5 wt %-NAFION/$H_2O$/2-propanol (Solution Technology Inc.) binder in a weight ratio of 88 wt %:12 wt % to prepare a catalyst composition for a cathode. The cathode was fabricated using the catalyst composition.

On the other hand, a Pt—Ru black (Johnson Matthey, HiSpec 100) cathode catalyst was mixed with a 5 wt %-NAFION/$H_2O$/2-propanol (Solution Technology Inc.)

binder in a weight ratio of 88 wt %:12 wt % to prepare a catalyst composition for an anode.

The catalyst composition for the anode was coated on a carbon paper to form the anode.

The prepared anode, the prepared cathode, and a commercially-available Nafion 115 (perfluorosulfonic acid) polymer electrolyte membrane were used to fabricate a membrane-electrode assembly.

The membrane-electrode assembly for a fuel cell was inserted between two sheets of gaskets, and then between two separators having a gas channel and a cooling channel with a certain (or predetermined) shape and compressed between copper end plates to fabricate a unit cell.

EXAMPLE 11

A unit cell was fabricated by the same (or substantially the same) method as in Example 10, except that 2 wt % of the $H_3PW_{12}O_{40}$ additive was mixed with 98 wt % of Pt black (Johnson Matthey, HiSpec 6000) cathode catalyst.

EXAMPLE 12

A unit cell was fabricated by the same (or substantially the same) method as in Example 10, except that 5 wt % of the $H_3PW_{12}O_{40}$ additive was mixed with 95 wt % of Pt black (Johnson Matthey, HiSpec 6000) cathode catalyst.

REFERENCE EXAMPLE 5

A unit cell was fabricated by the same (or substantially the same) method as in Example 10, except that 0.01 wt % of the $H_3PW_{12}O_{40}$ additive was mixed with 99.99 wt % of Pt black (Johnson Matthey, HiSpec 6000) cathode catalyst.

REFERENCE EXAMPLE 6

A unit cell was fabricated by the same (or substantially the same) method as in Example 10, except that 6 wt % of the $H_3PW_{12}O_{40}$ additive was mixed with 94 wt % of Pt black (Johnson Matthey, HiSpec 6000) cathode catalyst.

Power densities of the unit cells fabricated according to Examples 10 to 12, and Reference Examples 5 and 6 at 0.35V, 0.4V, and 0.45V were measured at 70° C. and the results are shown in Table 2. For comparison, the measurement result of Comparative Example 1 was also given.

TABLE 3

| | Additive amount with respect to the catalyst amount, wt % | 70° C., mW/cm² | | |
|---|---|---|---|---|
| | | 0.45 V | 0.4 V | 0.35 V |
| Reference Example 5 | 0.01 | 85 | 112 | 131 |
| Example 10 | 0.1 | 87 | 114 | 133 |
| Example 11 | 2 | 96 | 130 | 150 |
| Example 12 | 5 | 89 | 118 | 134 |
| Reference Example 6 | 6 | 86 | 118 | 134 |
| Comparative Example 1 | 0 | 85 | 112 | 131 |

As shown in Table 3, the cell including the electrode according to Examples 10 to 12 where from 0.1 to 5 wt % of $H_3PW_{12}O_{40}$ additives were mixed with the cathode catalysts show improved power densities as compared to that according to Comparative Example 1 without the additive. Further, the cell according to Reference Example 5 where the additive was added in a relatively small amount of 0.01 wt % and the cell according to Reference Example 6 where the additive was added in a relatively large amount of 6 wt % show rather lower power density than the cell according to Comparative Example 1.

In view of the foregoing, an electrode of an embodiment of the present invention may provide a relatively high power fuel cell while saving cost because it includes an additive having relatively high electron and proton conductivity.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a fuel cell comprising:
an electrode substrate comprising a first material; and
a catalyst layer on the electrode substrate,
wherein the catalyst layer comprises an active catalyst and a heteropoly acid additive comprising a heteropoly acid supported by an inorganic carrier comprising a second material different from the first material, the heteropoly acid additive having an average particle diameter ranging from about 1 nm to about 100 μm and; being present in an amount ranging from about 0.1 to about 5 wt % based on the total weight of the catalyst layer, and wherein the catalyst layer on the electrode substrate is configured as part of the fuel cell.

2. The electrode of claim 1, wherein the inorganic carrier comprises a material selected from the group consisting of $SiO_2$, zeolite, alumina, and combinations thereof.

3. The electrode of claim 1, wherein the heteropoly acid comprises a compound comprising an anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

4. The electrode of claim 1, wherein the heteropoly acid comprises a compound comprising a $H^+$ cation.

5. The electrode of claim 1, wherein the heteropoly acid is present in an amount ranging from about 0.01 to about 10 wt % based on the weight of the carrier.

6. A membrane-electrode assembly for a fuel cell, comprising:
an anode;
a cathode facing the anode; and
a polymer electrolyte membrane interposed between the anode and the cathode,
wherein at least one of the anode or the cathode comprises an electrode substrate comprising a first material and a catalyst layer on the electrode substrate, and
the catalyst layer comprises an active catalyst and a heteropoly acid additive comprising a heteropoly acid supported by an inorganic carrier comprising a second material different from the first material, the heteropoly acid additive having an average particle diameter ranging from about 1 nm to about 100 μm and; being present in an amount ranging from about 0.1 to about 5 wt % based on the total weight of the catalyst layer, and wherein the catalyst layer on the electrode substrate is configured as part of the fuel cell.

7. The membrane-electrode assembly of claim 6, wherein the inorganic carrier comprises a material selected from the group consisting of $SiO_2$, zeolite, alumina, and combinations thereof.

8. The membrane-electrode assembly of claim 6, wherein the heteropoly acid comprises a compound comprising an anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

9. The membrane-electrode assembly of claim 6, wherein the heteropoly acid comprises a compound comprising a $H^+$ cation.

10. The membrane-electrode assembly of claim 6, wherein the heteropoly acid is present in an amount ranging from about 0.01 to about 10 wt % based on the weight of the carrier.

11. A fuel cell system comprising:
an electricity generating element;
a fuel supplier for supplying the electricity generating element with a fuel; and
an oxidant supplier for supplying the electricity generating element with an oxidant,
wherein the electricity generating element comprises: an anode, a cathode facing the anode, and a polymer electrolyte membrane interposed between the anode and the cathode,
wherein at least one of the anode or the cathode comprises an electrode substrate comprising a first material and a catalyst layer on the electrode substrate, and
the catalyst layer comprises an active catalyst and a heteropoly acid additive comprising a heteropoly acid supported by an inorganic carrier comprising a second material different from the first material, the heteropoly acid additive having an average particle diameter ranging from about 1 nm to about 100 μm and; being present in an amount ranging from about 0.1 to about 5 wt % based on the total weight of the catalyst layer, and wherein the catalyst layer on the electrode substrate is configured as part of the fuel cell.

12. The fuel cell system of claim 11, wherein the inorganic carrier comprises a material selected from the group consisting of $SiO_2$, zeolite, alumina, and combinations thereof.

13. The fuel cell system of claim 11, wherein the heteropoly acid comprises a compound comprising an anion selected from the group consisting of $[PMo_{12}O_{40}]^{3-}$, $[PW_{12}O_{40}]^{3-}$, $[GeMo_{12}O_{40}]^{4-}$, $[GeW_{12}O_{40}]^{4-}$, $[P_2W_{18}O_{62}]^{6-}$, $[SiW_{12}O_{40}]^{4-}$, $[PMo_{11}O_{39}]^{7-}$, $[P_2Mo_5O_{23}]^{6-}$, $[H_2W_{12}O_{40}]^{6-}$, $[PW_{11}O_{39}]^{7-}$, and combinations thereof.

14. The fuel cell system of claim 11, wherein the heteropoly acid comprises a compound comprising a $H^+$ cation.

15. The fuel cell system of claim 11, wherein the heteropoly acid is present in an amount ranging from about 0.01 to about 10 wt % based on the weight of the carrier.

* * * * *

UNITED STATES PATENT AND TRADEMARK OFFICE
CERTIFICATE OF CORRECTION

PATENT NO. : 7,910,263 B2
APPLICATION NO. : 11/923601
DATED : March 22, 2011
INVENTOR(S) : In-Hyuk Son et al.

It is certified that error appears in the above-identified patent and that said Letters Patent is hereby corrected as shown below:

On the Title Page

| | |
|---|---|
| Item (56) References Cited OTHER PUBLICATIONS, 2nd Reference, line 4 | Delete "$[Pmo_{(12-n)}V_nO_{40}]$" Insert -- $[PMo_{(12-n)}V_nO_{40}]$ -- |
| Column 12, Claim 1, line 26 | Delete "and;" Insert -- and -- |
| Column 12, Claim 6, line 59 | Delete "and;" Insert -- and -- |
| Column 14, Claim 11, line 6 | Delete "and;" Insert -- and -- |

Signed and Sealed this
Twentieth Day of March, 2012

David J. Kappos
*Director of the United States Patent and Trademark Office*